United States Patent [19]
Saporetti

[11] Patent Number: 6,000,618
[45] Date of Patent: Dec. 14, 1999

[54] METHOD OF READING AN OBJECT-APPLIED BAR CODE

[75] Inventor: Claudio Saporetti, Bologna, Italy

[73] Assignee: Datalogic S.p.A., Italy

[21] Appl. No.: 09/000,793

[22] Filed: Dec. 30, 1997

[30] Foreign Application Priority Data

Dec. 30, 1996 [EP] European Pat. Off. ............... 96830662

[51] Int. Cl.⁶ ...................................................... G06K 7/10
[52] U.S. Cl. ................................ 235/462.24; 235/462.01; 235/462.08; 235/462.25
[58] Field of Search .................. 235/462.01, 462.02, 235/462.08, 462.11, 462.15, 462.16, 462.24, 462.25, 472.01, 454

[56] References Cited

U.S. PATENT DOCUMENTS

| | | | |
|---|---|---|---|
| 5,134,272 | 7/1992 | Tsuchiya et al. | 235/462.08 |
| 5,155,343 | 10/1992 | Chandler et al. | 235/462.24 |
| 5,296,691 | 3/1994 | Waldron et al. | 235/462.08 |
| 5,412,197 | 5/1995 | Smith | 235/462.11 |
| 5,521,368 | 5/1996 | Adachi | 235/462.1 |
| 5,523,552 | 6/1996 | Shallhammer et al. | 235/462.11 |
| 5,550,363 | 8/1996 | Obata | 235/462.11 |
| 5,698,833 | 12/1997 | Skinger | 235/462.08 |

FOREIGN PATENT DOCUMENTS

| | | |
|---|---|---|
| 0431264 | 6/1991 | European Pat. Off. . |
| 0449634 | 10/1991 | European Pat. Off. . |

OTHER PUBLICATIONS

European Search Report dated May 5, 1997 for Appln. No. EP 96 83 0662.

*Primary Examiner*—Donald Hajec
*Assistant Examiner*—Daniel St. Cyr
*Attorney, Agent, or Firm*—Hall, Priddy & Myers

[57] ABSTRACT

A method whereby the image of a bar code is located in a digitized image of an object traveling along a conveyor belt; the orientation of the longitudinal axis of the code with respect to a reference system of the image is determined, and the code is scanned along lines parallel to the longitudinal axis of the code to generate respective vectors describing the pattern of the code image brightness signal along the respective line; and the vectors are digitized and projected to generate a real-number vector containing the coordinates of the brightness signal transition points indicating the shape and location of the code elements.

13 Claims, 4 Drawing Sheets

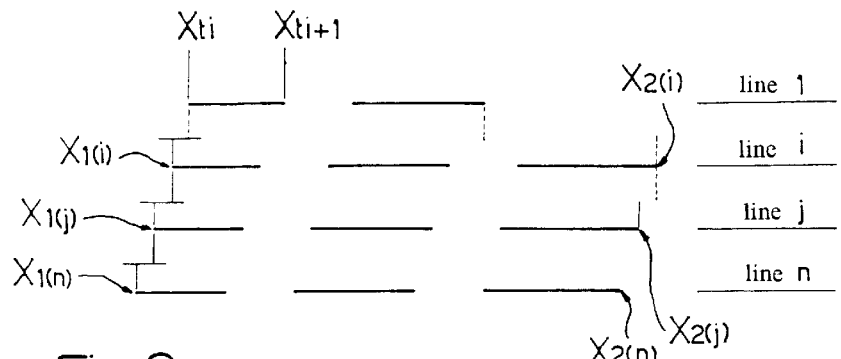
Fig.8    Fig.9
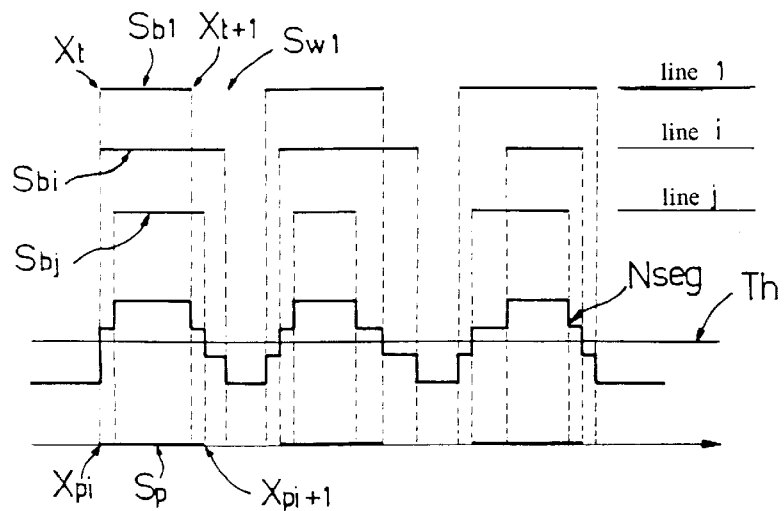
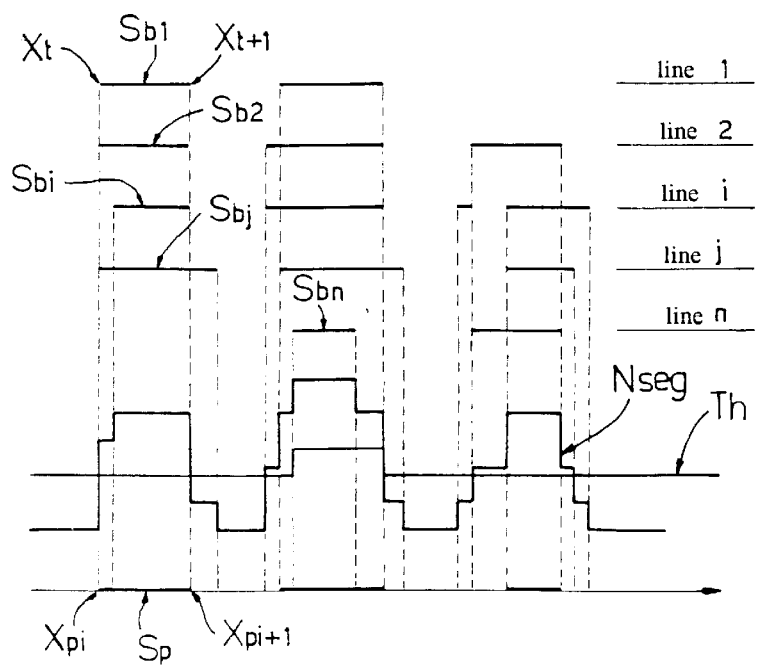
Fig.10

METHOD OF READING AN OBJECT-APPLIED BAR CODE

BACKGROUND OF THE INVENTION

The present invention relates to a method of reading an object-applied bar code.

As is known, reading a bar code from an image picked up by a CCD telecamera poses various problems involving several factors.

A first factor is the poor definition of the image. To obtain the largest possible scanning field using a low-cost processing system, the acquired images must comprise the smallest possible number of pixels. At present, normal data acquisition systems require that the sampling frequency be at least twice the maximum frequency of the sampled signal, so that, in the case of a bar code, if the module is defined as the nominal dimension of the smallest component element (bar or space), an exact reconstruction of the corresponding square wave would require an enormous number of pixels per module.

A second factor involves random code orientation and anisotropy of the telecamera. As the orientation of acquired codes is not normally fixed with respect to the axes of the telecamera, systems must be used which are capable of reading the code regardless of how it is oriented, or which are capable of rotating the image accordingly. Moreover, as the pixels of any telecamera are square, the code image varies according to orientation of the code. In short, the difficulties encountered in reading the code differ according to its orientation.

A third factor involves grey level quantization and acquisition noise. As is known, a pixel is always coded by a finite number of grey levels, whereas the high acquisition speed demanded by current scanning systems prevents, the use of analog-digital converters with a large number of significant bits. Moreover, the thermal noise of the telecamera and the analog part of the read system has a negative effect on the accuracy of the sampled signal.

A fourth factor is blooming of the image, due to the code image being acquired by a system of lenses inevitably involving a certain amount of aberration and lack of uniformity, and due to the distance of the code from the telecamera not always being accurately known.

A fifth factor involves illumination of the code. As is known, the code is illuminated by a lighting device set up in a fixed position, so that the distance between the lighting device and the code, and the distance between the code and the telecamera vary continually according to the location of the code within the scanning field, thus resulting at times in the acquisition of poorly illuminated codes and, hence, in acquisition accompanied by severe quantization noise. On the other hand, if the code is a reflecting type or covered with a film of plastic material, even the best illumination system may result in reflection capable of dazzling the telecamera.

Finally, a sixth factor involves flaws in the code itself (smudges, chafing, poor contrast, tears, incorrect relationship between the code elements, etc.) due to printing errors or deterioration of the print medium.

SUMMARY OF THE INVENTION

It is an object of the present invention to provide a method of reading an object-applied bar code, designed to overcome the aforementioned drawbacks.

According to the present invention, there is provided a method of reading a bar code applied to an object, and comprising: an image acquisition step wherein at least one image (I) of an object bearing said bar code is acquired; and a locating step wherein the location of the bar code within said image (I) is determined; characterized by also comprising: an orientation detecting step for determining the orientation ($\alpha$) of the longitudinal axis (H) of the bar code with respect to a reference system (X, Y); a scanning step for generating at least two (n) vectors, each containing the code image samples detected along respective lines (R1, R2, ..., Rn) parallel to the longitudinal axis (H) of the code, each vector describing the pattern of a signal representing the brightness (V(x)) of the code image along the respective line (R1, R2, ..., Rn); a digitizing step for digitizing said vectors (V(x)) and generating, for each examined vector, an output vector containing at least the coordinates of a number of transition points (xti) located along a respective line (R1, R2, ..., Rn), pairs of adjacent transition points (xti, Xti+1) defining the limits of a significant segment (Sbi) corresponding to the width of a black bar of the bar code, and the significant segments (Sbi) alternating with space segments (Swi) corresponding to the white spaces of the code; a grouping step wherein said coordinates (xti) of said digitized vectors are composed to generate a single output vector; and a processing step for processing said output vector to decode the bar code.

Preferably, the grouping step comprises the substeps of: determining any shift (s) between groups of transition points (xti) on different lines (R1, R2, ..., Rn); and applying to at least some of said groups of points a shift opposite to the detected shift, to realign said groups of points.

Also, the step of applying to at least some of said groups of points a shift opposite to the detected shift is followed by a projection step wherein: significant segments (Sb1, Sb2, ..., Sbn) corresponding to different scan lines (R1, R2, ..., Rn) are arranged in parallel paths having the same origin, the significant segments (Sb1, Sb2, ..., Sbn) defining a number of source segments; a further path parallel to the parallel paths and having the same origin is defined; for each point in the further path, the number of corresponding significant segments in the other paths is calculated; the calculated number is compared with a threshold (Th); if said number is above the threshold (Th), the point in the further path is assumed to form part of a significant segment (Sp) in the further path; the further path comprising a number of significant segments (Sp) which are a projection of the significant source segments; and said significant segments being defined by transition points (xtpi) forming part of said single output vector.

The method according to the present invention provides for reading bar codes effectively and rapidly by eliminating problems involving random code orientation, anisotropy of the telecamera, grey level quantization, acquisition noise, image blooming, improper code illumination, and flaws in the code itself.

BRIEF DESCRIPTION OF THE DRAWINGS

A number of non-limiting embodiments of the present invention will be described by way of example with reference to the accompanying drawings, in which:

FIGS. 4 to 10 show steps in the read method according to the teachings of the present invention.

DETAILED DESCRIPTION OF THE INVENTION

Figure 1:
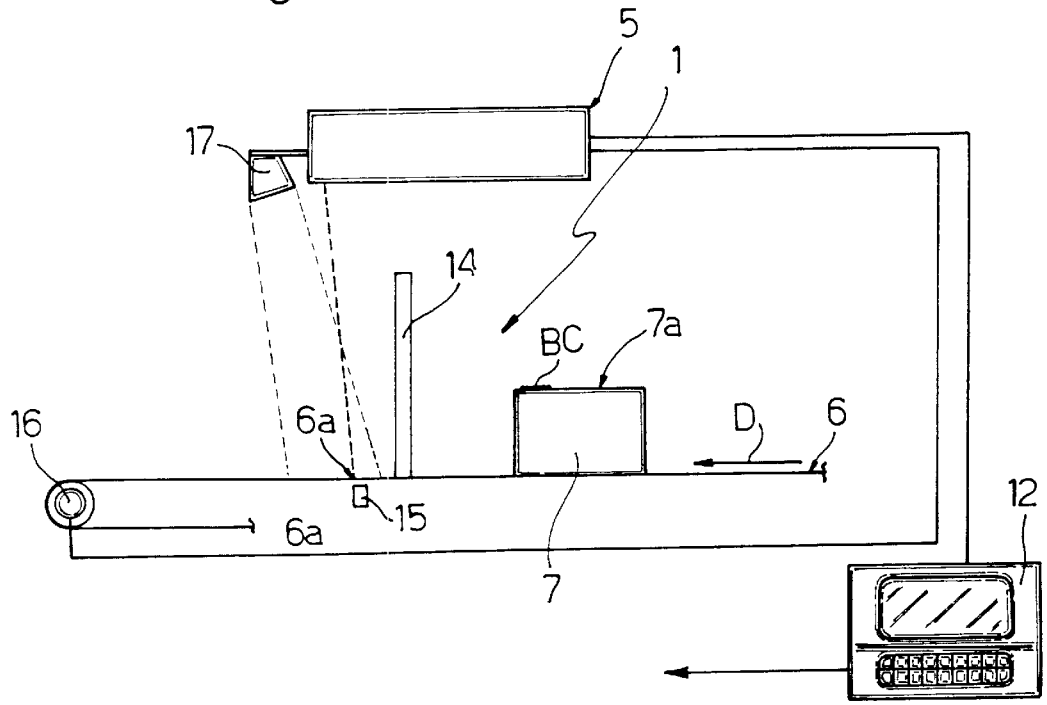
FIG. 1 shows a schematic view of an automatic bar code reading device implementing the method according to the present invention.

Number 1 in FIG. 1 indicates an automatic reading device comprising a reading head 5 facing a conveyor belt 6 and for scanning objects 7 located on conveyor belt 6, traveling in a straight horizontal direction D, and each bearing, on the surface 7a facing reading head 5, a bar code BC comprising a number of straight, dark (in particular, black) parallel bars alternating with white spaces.

Device 1 also comprises an electronic processing and control unit 12 cooperating with reading head 5.

Device 1 also comprises a sensor 14 located along conveyor belt 6 to determine the height of objects 7 traveling along the belt; a sensor 15 for determining the presence of objects 7 in the vicinity of reading head 5; and a speed sensor 16 for determining the traveling speed of the belt (and hence the conveyed objects) with respect to reading head 5.

Device 1 also comprises a lighting device 17 for lighting the belt portion scanned by reading head 5.

Figure 2:
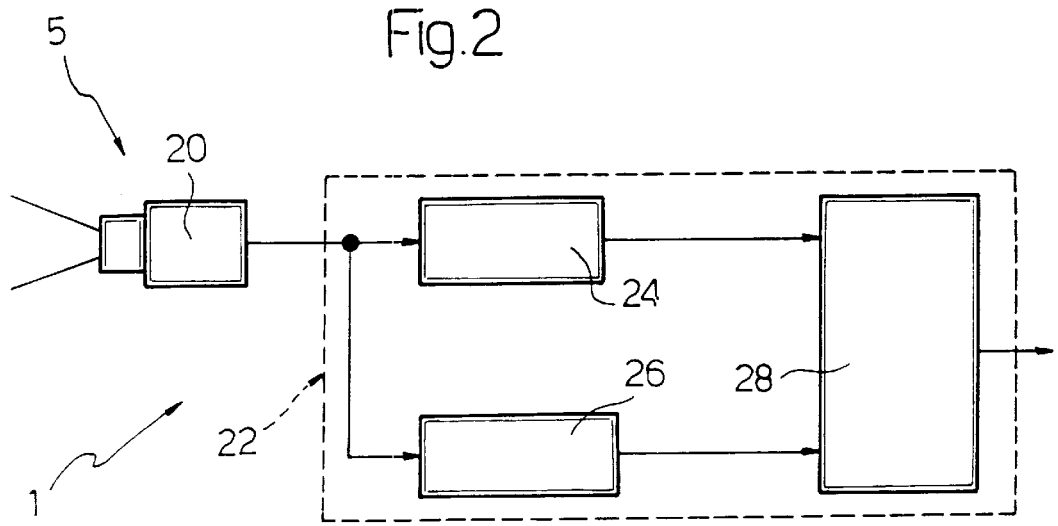
FIG. 2 shows a block diagram of part of the FIG. 1 device.

With reference to FIG. 2, reading head 5 comprises a linear CCD telecamera 20 for scanning (either continuously or when enabled by sensors 14, 15 and 16) a line 6a of the belt perpendicular to the traveling direction of the belt; and a circuit 22 for processing the output signals generated by telecamera 20. Circuit 22 comprises a filter 24 connected at the input to the output of telecamera 20; an image memory 26 connected at the input to the output of telecamera 20; and a programmabLe data processing unit (digital signal processor—DSP) 28 cooperating with filter 24 and memory 26. More specifically, the data picked up by telecamera 20 relative to read lines 6a may be stored in memory 26 to reconstruct (in known manner) the image of a portion of belt 6 and the objects traveling along that portion.

Figure 3:
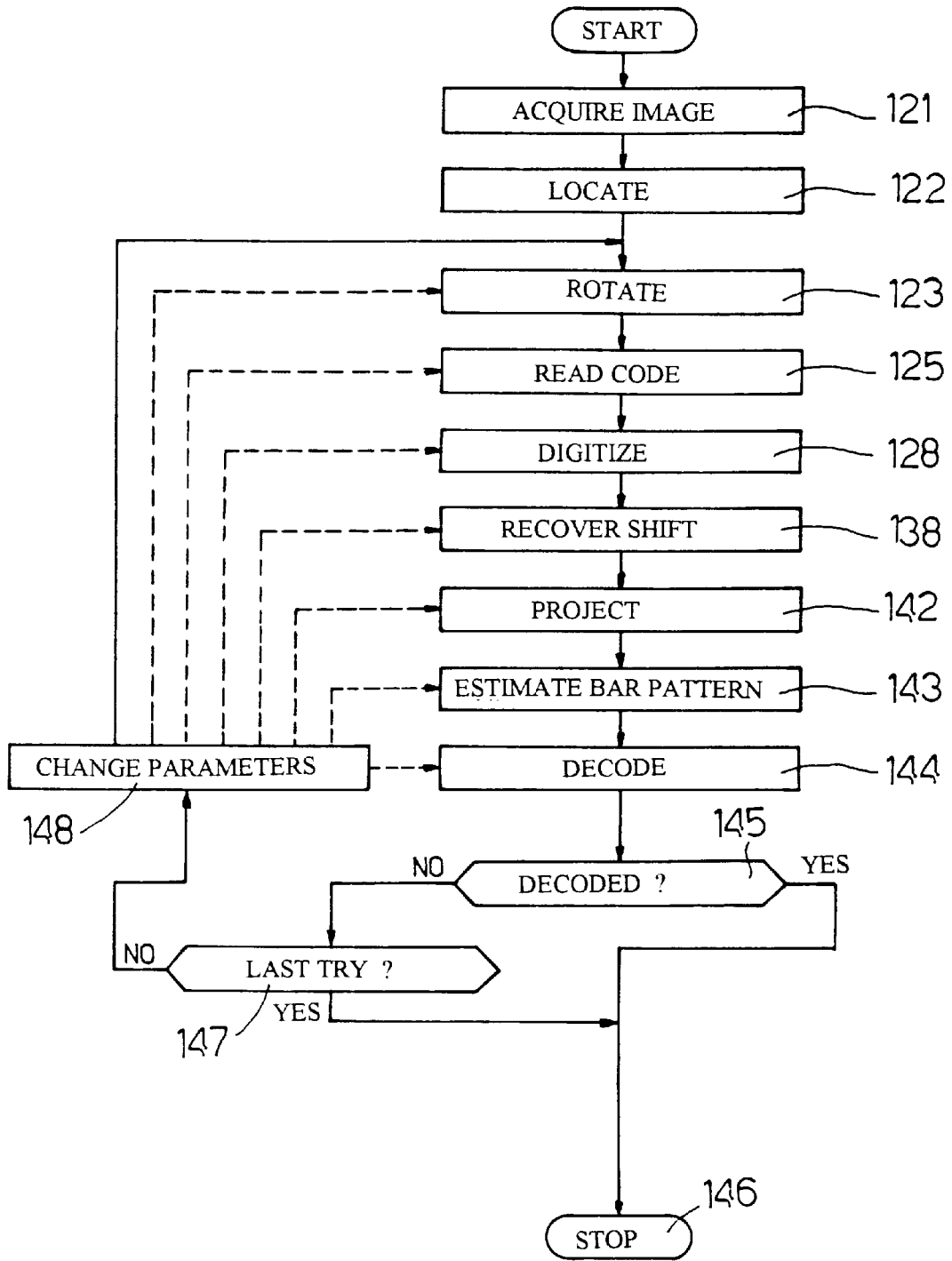
FIG. 3 shows a flow chart of the operating cycle of the method according to the present invention.

FIG. 3 shows a block diagram of the operating cycle of processing circuit 22.

More specifically, and as shown in FIG. 3, a start block goes on to a block 121, in which a digitized image of conveyor 6 and objects 7 on it is acquired to form a digital image I comprising a matrix of pixels, each characterized by a whole number defining its grey level. The acquired digital image I comprises the image of at least one object 7 on conveyor belt 6, bearing bar code BC.

Block 121 is followed by a block 122, which (in known manner) locates the portion (window) of image I containing the image of bar code BC. That is, block 122 "extracts" the portion of image I containing the bar code image, i.e. the outside dimensions of the perimeter enclosing the code, and the pixel matrix inside the perimeter; and each pixel in the matrix is defined by a whole number indicating the grey level of the code image.

The term "code" used for the sake of simplicity in the following description is intended to mean the image of the code.

Figure 4:
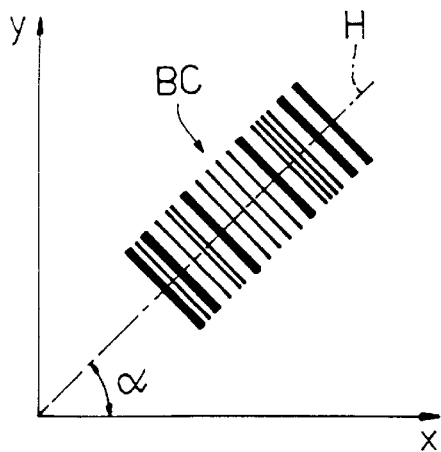

Block 122 goes on to a block 123, which determines the orientation of bar code BC with respect to the X axis of a cartesian X, Y reference system relative to the window containing the code. For example, the X axis may be the longitudinal axis of the scanning field of telecamera 20, and the Y axis may correspond to the traveling direction of object 7. More specifically, block 123 calculates code orientation angle α (FIG. 4), i.e. the angle formed between the X axis and the longitudinal axis H of the code. The longitudinal axis H of the code is obviously the axis extending perpendicularly to the straight parallel black bars forming the code, i.e. parallel to the long sides of the rectangle enclosing the code.

Figure 5:
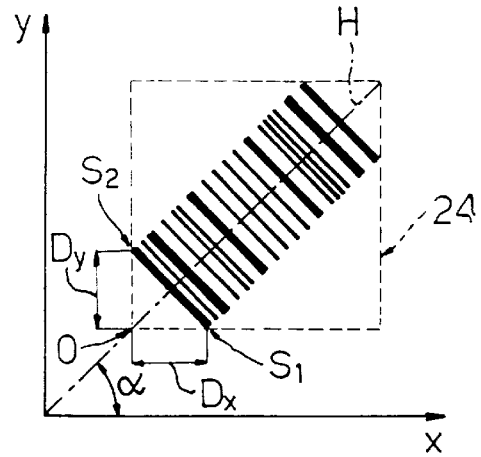

Angle α is calculated by determining the points at which the code intersects a rectangular window 24 enclosing the code, as shown in FIG. 5. Window 24 may be processed in known manner directly in block 123 or 122 during the code location step.

Angle α equals arctg(DX/DY), where DX and DY are the distances between a vertex O of window 24 and respective points S1 and S2 at which respective opposite end portions of a first/last black bar of the code intersect respective sides of window 24 parallel to respective axes X and Y. If the orientation of the code (angle α) is close to 0° or 90°, distances DX and DY are difficult to determine accurately, in which case, the area of the code is roughly equal to the area of the surrounding window, and the orientation of the code is so determined that longitudinal axis H corresponds to the longer side of window 24.

If the ratio of the sides of the code is close to one (i.e. if the perimeter of the code is substantially square), the above method of determining angle α does not function correctly, by virtue of the area of the code being roughly equal to the area of the surrounding window.

In this case, a central portion of the code presumably containing no significant flaws is selected; the mean value vector of the image gradients within said portion is calculated (in known manner); and angle α is subsequently calculated by determining the orientation of the mean value vector of the gradients with respect to the X, Y cartesian reference system.

In block 123, the code is rotated about the origin O (center of window 24) by −α degrees, so that the longitudinal axis H of the code is parallel to the X axis, thus transforming (FIG. 6) a rectangular source window 24 (X, Y reference system) into a rectangular destination window 26 with an X', Y' Cartesian reference system. The code is rotated point by point using known techniques, e.g. trigonometric equations:

$$x = ax' + by' + c$$

$$y = dx' + ey' + f$$

where x, y are the points of source window 24; x', y' are the points of destination window 26; and a, b, c, d, e, f are functions of α.

For each point X', y' in destination window 26, the coordinates of the corresponding point x, y in source window 24 are calculated.

Figure 7:
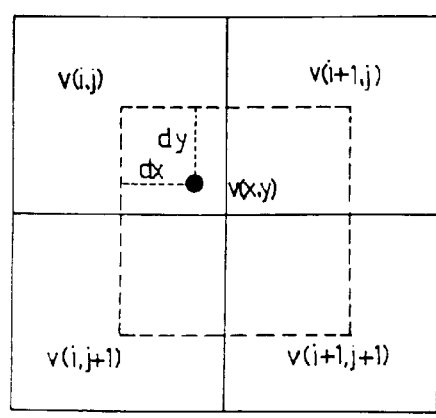

If coordinates x, y of the point in source window 24 are not whole numbers, the four closest points are interpolated as shown in FIG. 7. That is, a window 27, comprising for example four pixels about point x, y, is evaluated, and the brightness value of point x, y is calculated and assigned to point x', y'.

This calculation is made using the following equation:

$$v_{(x,y)} = v(i,j) \cdot (1-dx) \cdot (1-dy) + v(i+1, j) \cdot (1-dx) \cdot dy + v(i,j+1) \cdot dx \cdot (1-dy) + v(i+1,y+1) \cdot dx \cdot dy$$

where:

$V_{(x,y)}$ is the brightness value of the intermediate point with real coordinates x,y;

$V_{(i,j)}$ is the brightness value of the point sampled at coordinates i,j;

i is the maximum whole number less than x;

j is the maximum whole number less than y;

dx equals x−i;

dy equals y−j.

The above steps provide for recovering the random orientation of the code, so that codes with any orientation with respect to the telecamera may be read.

During rotation, the scale of the image may also be modified to fictitiously increase resolution along the X axis.

Figure 6:
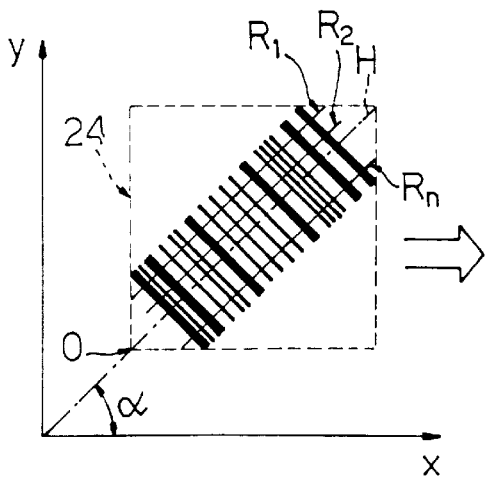
Figure 6:
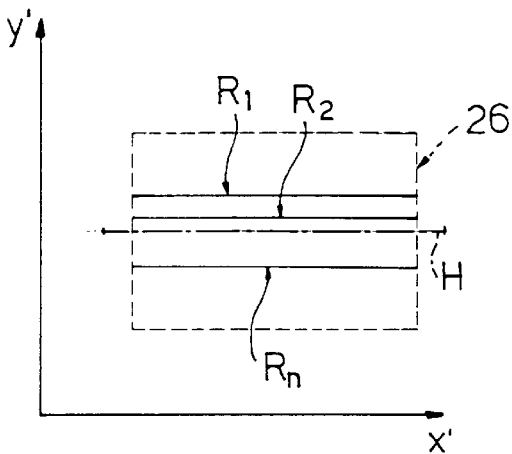

Block 123 is followed by a scanning block 125, which obtains n vectors V(x) containing the image samples detected along n lines parallel to the longitudinal axis H of the code (e.g. n lines R1, R2, . . . , Rn, as shown in FIG. 6). Each vector V(x) describes the pattern, along an axis parallel to axis H, of the brightness signal associated with the bar code image.

Block 125 is followed by a block 128 for performing a known digitization process, and which, starting with each vector V(x) describing the pattern of the brightness signal along a respective line R1, R2, . . . , Rn of the code, generates a real-number vector of variable length describing the coordinates Xti of all the white-to-black (and black-to-white) transition points characteristic of the code.

The digitization process substantially comprises searching for the basic characteristics and critical (minimum and maximum) points of brightness signal V(x), and locating and fine-positioning the significant edges. The edge of the signal is intended to mean the steeply sloping portion extending between an upper limit and a lower limit.

Transition points Xti on different lines R1, R2, . . . , Rn are not perfectly coincident, owing to certain factors resulting in differences, in particular a shift, between one line and another. Such factors substantially comprise errors in acquisition speed and in the calculation of rotation angle α, which result in a shift between one scan line and the next. Additional errors are introduced by blooming of the code, quantization noise, and the state of the code (scratches, smudges, etc.), all of which affect the apparent size of each bar on each line, and the number of bars located.

Block 138 downstream from block 128) determines and eliminates the shift introduced by the above factors between one line and another.

To determine shift, the code-start and -end coordinates $x_1$, $x_2$ are determined by locating possible code portions within the line, i.e. high-information-content (high-transition-content) portions commencing or terminating with a "white" (no-transition) portion much wider than the others. If these characteristics are found in several line portions, the possible code portion is that with the greatest number of transitions. More specifically, the code-start coordinates $x_1$ of groups of transition points on different lines R1, R2, . . . , Rn are determined; and an iterative calculation is made of a number of differences (distances) $s_1[i]$ between the code-start values ($x_1$) of one line and the code-start values of an adjacent line, i.e.:

$$s_1[i]=x_1[i]-x_1[i+1] \text{ where } i \in [1,n-1]$$

The mean value $s_{1m}$ of differences $s_1[i]$ is also calculated and assumed as representing the shift.

Alternatively, an iterative calculation is made of a number of differences (distances) $s_2[i]$ between the code-end values $x_2$ of one line and the code-end values of an adjacent line, i.e.:

$$s_2[i]=x_2[i]-x_2[i+1] \text{ where } i \in [1,n-1]$$

The mean value $s_{2m}$ of differences $s_2[i]$ is also calculated and assumed as representing the shift.

If the determined $x_1$ and $x_2$ values actually represent the start and end of the code, the mean value of differences s represents the shift. In the event of errors, the mean value contains mostly corrected differences, but also some that are way off average, and which are eliminated by calculating the histogram function of differences $s_1[i]$ or $s_2[i]$, determining the highest-frequency class within the histogram function, and, finally, calculating the shift as the mean value of the differences in the highest-frequency class.

Shift may also be calculated by successively determining, for each line, the distances between the code start of groups of transition points on that particular line, and the code start of groups of transition points on the other n-1 lines; and each calculated distance is weighted according to the distance between the pair of lines considered, i.e. is divided by a whole number, which equals one in the case of the distance between the line in question and the adjacent line, and which increases by one for each successive line.

All this is expressed in the equation:

$$s_{i,j}=(x_1[i]-x_1[j])/(i-j) \text{ where } i \in [1,n-1] j \in [i+1,n]$$

The above operations are repeated for all of lines R1, R2, . . . , Rn, to determine a number of distances, the mean value of which is calculated and assumed as representing the shift.

Similarly, shift may also be calculated by successively determining, for each line, the distances between the code end of groups of transition points on that particular line, and the code end of groups of transition points; on the other n-1 lines; and each calculated distance is weighted according to the distance between the pair of lines considered, i.e. is divided by a whole number, which equals one in the case of the distance between the line in question and the adjacent line, and which increases by one for each successive line.

All this is expressed in the equation:

$$s_{i,j}=(x_2[i]-x_2[j])/(i-j) \text{ where } i \in [1,n-1] j \in [i+1,n]$$

The above operations are repeated for all of lines R1, R2, . . . , Rn, to determine a number of distances, the mean value of which is calculated and assumed as representing shift s.

Once the shift is determined, an opposite shift is applied to each scan line (as shown in FIG. 9) to realign all of lines R.

For example, given an initial reference scan line, the adjacent line is applied an opposite shift to that calculated, and the other lines are applied (with a negative sign) said shift multiplied by a whole number, which equals one in the case of the reference line and the line adjacent to it, and which increases by one for each successive line.

Block 138 is followed by a block 142, which, commencing with the realigned lines, constructs a projection line (bottom part of FIG. 9), each point of which has the value of the majority of lines at that point.

More specifically, each line now comprises a number of transition points Xti along axis X'; pairs of adjacent transition points (xti, Xti+1) define the limits of a black segment Sbi corresponding to the width of a black bar of the code; and segments Sbi alternate with white segments Swi corresponding to the white spaces of the code.

In the projection process:
the white segments Sb1, Sb2, . . . , Sbn of different lines R1, R2, . . . , Rn are arranged in parallel lines having the same origin, significant segments Sb1, Sb2, . . . , Sbn defining a number of source segments;
a further path P parallel to the parallel lines and having the same origin is defined;
for each point in the further path P, the number Nseg of corresponding black segments in the other lines is calculated;
the calculated number Nseg is compared with a threshold Th, and, if said number is above threshold Th, the point in the further path is assumed as forming part of a black segment Sp in the further line. The further line now comprises a number of black segments Sp, which are a "projection" of the black source segments, and are each defined by a pair of "projection" transition points Xp, Xp+1, which together define a single output vector which is subsequently decoded.

The projection line in FIG. 9 is formed with respect to a fixed threshold value Th, which may result in error if the lines are as shown in FIG. 10 (i.e. some incomplete). That is, if angle α or the center of the code is not determined perfectly, some of the lines (normally the first and last) are incomplete, thus increasing the likelihood of an end bar not being recognized or being recognized wrongly.

To eliminate the above error, the projection line is determined by introducing a movable threshold value Th as shown in FIG. 10.

More specifically, for each point in the further line, the number of valid source lines is calculated: a line is considered valid if the portion surrounding the point in question contains no no-transition portion.

If the number of valid lines does not exceed a minimum value (e.g. half the possible lines), there can be no bars in that portion (infinite Th). Conversely, if the number of valid lines is sufficient:

$$Th=ceil(number\ of\ valid\ lines/2)$$

where the ceil(x) function restores the minimum whole number greater than x.

Block 142 generates a sequence of coordinates Xtpi of white-to-black and black-to-white transitions in the projection image, which transitions Xtpi are used by the next block 143 to calculate the dimensions of the bars and spaces in the code.

Block 143 is followed by a block 144, which decodes the code according to the bar and space dimensions calculated as described above.

Block 144 is followed by a block 145, which determines whether the code has been decoded. If it has, block 145 goes on to a final block 146. If it has not, block 145 goes on to a block 147, which determines whether the latest attempt to decode the code is the last of a predetermined memorized number of attempts. If it is, block 147 goes on to block 146. If it is not, block 147 goes on to block 148, which modifies one or more of the parameters used in blocks 123, 125, 128, 142, 143 and 144, and then goes back to block 123.

The method according to the present invention therefore provides for effectively and rapidly reading a bar code by solving any problems caused by poor image definition, random code orientation, anisotropy of the telecamera, grey level quantization, acquisition noise, image blooming, incorrect code lighting, and flaws in the code itself.

It is claimed:

1. A method of reading a bar code applied to an object (7), and comprising:
   an image acquisition step (121) wherein at least one image (I) of an object (7) bearing said bar code (BC) is acquired; and
   a locating step (122) wherein a location of the bar code within said image (I) is determined;
   the method further comprising:
   an orientation detecting step (123) for determining the orientation (*) of a longitudinal axis (H) of the bar code with respect to a reference system (X, Y);
   a scanning step (125) for generating at least two (n) vectors (V(x)), each containing code image samples detected along respective lines (R1, R2, . . . , Rn) parallel to the longitudinal axis (H) of the code; each vector describing a pattern of a signal representing the brightness V(x) of the code image along the respective line (R1, R2, . . . , Rn);
   a digitizing step (128) for digitizing said vectors (V(x)) and generating, for each examined vector, an output vector containing at least coordinates of a number of transition points (xti) located along a respective line (R1, R2, . . . , Rn); pairs of adjacent transition points (xti, Xti+1) defining the limits of a significant segment (Sbi) corresponding to a width of a black bar of the bar code; and a significant segments (Sbi) alternating with space segments (Swi) corresponding to white spaces of the code;
   a grouping step (138, 142) wherein said coordinates (xti) of said digitized vectors are composed to generate a single output vector; and
   a processing step (144) for processing said output vector to decode the bar code.

2. A method as claimed in claim 1, characterized in that said grouping step (138, 142) further comprises the steps of:
   determining (138) any shift between groups of transition points (xti) on different lines (R1, R2, . . . , Rn); and
   applying to at least some of said groups of transition points a shift opposite to a detected shift, to realign (138) said groups of points.

3. A method as claimed in claim 2, characterized in that said step of determining any shift comprises the steps of:
   determining code-start coordinates ($x_1$) of groups of transition points (Xti) on different lines (R1, R2, . . . , Rn);
   iteratively calculating a number of distances ($s_i[i]$) between the code-start values ($x_1$) of one line and code-start values of an adjacent line;
   calculating a mean value ($S_{1m}$) of said distances (s); and
   assuming said mean value ($S_{1m}$) as representing said shift.

4. A method as claimed in claim 3, characterized by also comprising the steps of:
   calculating a histogram function of said distances;
   extracting a highest-frequency class from said histogram function; and
   calculating said shift as the mean value of distance values in the highest-frequency class.

5. A method as claimed in claim 2, characterized in that said step of determining any shift (138) comprises the steps of:
   determining code-end coordinates ($x_2$) of groups of transition points on different lines (R1, R2, . . . , Rn);
   iteratively calculating a number of distances ($s_2[i]$) between code-end values ($x_2$) of one line and code-end values of an adjacent line;
   calculating a mean value ($S_{2m}$) of said distances; and
   assuming said mean value ($S_{2m}$) as representing said shift.

6. A method as claimed in claim 2, characterized in that said step of determining any shift (138) comprises the steps of:
   successively determining, for each line, distances between the code start of groups of transition points on that particular line, and a code start of groups of transition points on the other (n−1) lines; each calculated distance being weighted according to a distance between the pair of lines considered, by dividing said distance by a whole number, which equals one in the case of the distance between the line being examined and the adjacent line, and which increases by one for each successive line ($S_{i,j}=(x_1[i]-x_1[j])/(i-j)$ where i∈[1, n−1]j∈[i+1,n]);

repeating said distance determining step for all the lines (R1, R2, . . . , Rn), to determine a number of distances;

calculating a mean value of said distances; and assuming said mean value as representing the shift.

7. A method as claimed in claim 2, characterized in that said step of determining any shift 138) comprises the steps of:

successively determining, for each line, distances between a code end of groups of transition points on that particular line, and the code end of groups of transition points on other (n−1) lines; each calculated distance being weighted according to a distance between the pair of lines considered, by dividing said distance by a whole number, which equals one in the case of the distance between the line being examined and the adjacent line, and which increases by one for each successive line ($s_{i,j}=(x_2[i]-x_2[j])/(i-j)$ where i∈[1, n−1] j∈[i+1,n]);

repeating said distance determining step for all the lines (R1, R2, . . . , Rn), to determine a number of distances;

calculating a mean value of said distances; and assuming said mean value as representing the shift.

8. A method as claimed in claim 2, characterized in that said step of applying to at least some of said groups of transition points a shift opposite to the detected shift is followed by a projection step (142) wherein:

significant segments (Sb1, Sb2, . . . , Sbn) corresponding to different scan lines (R1, R2, . . . , Rn) are arranged in parallel paths having a same origin; the significant segments (Sb1, Sb2, . . . , Sbn) defining a number of source segments;

a further path (P) parallel to the parallel paths and having the same origin is defined;

for each point in the further path, a number of corresponding significant segments in the other paths is calculated;

the calculated number is compared with a threshold (Th), and, if said number is above the threshold (Th), the point in the further path is assumed to form part of a significant segment (Sp) in the further path; the further path comprising a number of significant segments (Sp) which are a projection of the significant source segments; and said significant segments being defined by transition points (xtpi) forming part of said single output vector.

9. A method as claimed in claim 8, characterized in that said projection step (142) also comprises the steps of:

calculating, for each point in the further path (P), a number of corresponding valid source lines; a line being valid if a portion surrounding the point being examined contains no no-transition portion;

if the number of valid source lines exceeds a limit value, said threshold (Th) being defined as:

Th=ceil(number of valid lines/2)

where Th represents said threshold, and the ceil(x) function restores the minimum whole number greater than x.

10. A method as claimed in claim 1, characterized in that said orientation detecting step (123) comprises the steps of:

defining a rectangular window (24) containing said code;

determining at least a first and second distance (DX, DY) between a reference point (O) of said rectangular window (24) and a first and second point (S1, S2) at which respective end portions of a black bar (S) of the bar code intersect said window (24); and calculating an angle (α) indicating said orientation by means of said distances (arctg(DX/DY)).

11. A method as claimed in claim 10, characterized in that, if the orientation of the code (α) is close to 0° or 90°, the orientation of the code is so determined that the longitudinal axis (H) of the code itself corresponds to the longer side of said window (24).

12. A method as claimed in claim 1, characterized in that, if a ratio between sides of the code is close to one, said orientation detecting step comprises the steps of:

selecting a central portion of the bar code;

calculating a mean value vector of gradients of the image in said central portion; and determining the orientation of the mean value vector of the gradients with respect to a reference system (X,Y) to calculate said orientation.

13. A method as claimed in claim 1, characterized in that said orientation detecting step is followed by a rotation step wherein, on the basis of the orientation (α) determined, a transformation is performed from a source reference system (X,Y) to a destination reference system (X',Y') wherein said longitudinal axis (H) is parallel to a coordinate axis (X).

* * * * *